United States Patent
Lo Iacono et al.

(10) Patent No.: US 9,787,185 B2
(45) Date of Patent: Oct. 10, 2017

(54) BOOST CONVERTER AND RELATED INTEGRATED CIRCUIT

(71) Applicant: STMicroelectronics S.r.l., Agrate, Brianza (IT)

(72) Inventors: Gioacchino Lo Iacono, Catania (IT); Domenico Cristaudo, Tremenstrieri Etneo (IT); Daniele Battaglia, San Gregorio di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 14/840,347

(22) Filed: Aug. 31, 2015

(65) Prior Publication Data
US 2016/0079857 A1   Mar. 17, 2016

(30) Foreign Application Priority Data
Sep. 17, 2014  (IT) ............................... TO2014A0733

(51) Int. Cl.
| H02M 3/158 | (2006.01) |
| H02M 3/156 | (2006.01) |
| H02M 1/00 | (2006.01) |

(52) U.S. Cl.
CPC .......... *H02M 3/158* (2013.01); *H02M 3/156* (2013.01); *H02M 2001/0025* (2013.01);
(Continued)

(58) Field of Classification Search
CPC . H02M 2001/0025; H02M 2001/0035; H02M 2001/0048; H02M 3/156; H02M 3/158; Y02B 70/1491; Y02B 70/16
See application file for complete search history.

(56) References Cited

U.S. PATENT DOCUMENTS

| 6,411,531 B1 * | 6/2002 | Nork ..................... H02M 3/073 363/60 |
| 6,750,642 B2 * | 6/2004 | Murakata .............. H02M 3/156 323/222 |

(Continued)

FOREIGN PATENT DOCUMENTS

| CN | 102822760 A | 12/2012 |
| CN | 203261237 U | 10/2013 |

OTHER PUBLICATIONS

IT Search Report and Written Opinion for TO2014A000733 dated May 8, 2015 (7 pages).
(Continued)

*Primary Examiner* — Fred E Finch, III
*Assistant Examiner* — Demetries A Gibson
(74) *Attorney, Agent, or Firm* — Gardere Wynne Sewell LLP (57) ABSTRACT

A boost converter receives an input voltage and provides an output voltage and includes a power switch and a voltage control circuit configured to drive the power switch as a function of the output voltage. A voltage sensing circuit in the form of a voltage divider is coupled to sense the output voltage and provide a feedback voltage. The voltage control circuit drives the power switch. An electronic control switch is configured to selectively connect the voltage divider to sense the output voltage as a function of an enable signal generated by a timer circuit. The enable signal is pulsed such that the voltage divider is periodically connected to sense the output voltage during a first time and is disconnected from sensing during a second time.

10 Claims, 6 Drawing Sheets

(52) U.S. Cl.
CPC ............... *H02M 2001/0035* (2013.01); *H02M 2001/0048* (2013.01); *Y02B 70/1491* (2013.01); *Y02B 70/16* (2013.01)

(56) References Cited

U.S. PATENT DOCUMENTS

| | | | | |
|---|---|---|---|---|
| 6,819,091 | B2* | 11/2004 | Ishihara | ................... G05F 1/567 |
| | | | | 323/285 |
| 8,222,881 | B2* | 7/2012 | Ivanov | ....................... G05F 1/56 |
| | | | | 323/282 |
| 9,166,470 | B2* | 10/2015 | Kelly | ................... H02M 1/4225 |
| 9,496,782 | B2* | 11/2016 | Eckel | ................... H05B 33/0815 |
| 2003/0227279 | A1* | 12/2003 | Feldtkeller | ............ H02M 3/156 |
| | | | | 323/222 |
| 2005/0052222 | A1* | 3/2005 | Ootani | ................... H02M 3/156 |
| | | | | 327/536 |
| 2007/0229149 | A1 | 10/2007 | Pan et al. | |
| 2008/0024096 | A1 | 1/2008 | Pan | |
| 2009/0115500 | A1 | 5/2009 | Kuwagata et al. | |
| 2010/0244789 | A1* | 9/2010 | Osaka | ................... H02M 3/1584 |
| | | | | 323/271 |
| 2012/0025897 | A1* | 2/2012 | Wasekura | ............... H03K 17/14 |
| | | | | 327/518 |
| 2014/0312870 | A1* | 10/2014 | Imayoshi | ............... H02M 3/156 |
| | | | | 323/284 |

OTHER PUBLICATIONS

First Office Action and Search Report for co-pending CN Appl. No. 201510595529.7 dated Jun. 28, 2017 (9 pages).

* cited by examiner

BOOST CONVERTER AND RELATED INTEGRATED CIRCUIT

PRIORITY CLAIM

This application claims priority from Italian Application for Patent No. TO2014A000733 filed Sep. 17, 2014, the disclosure of which is incorporated by reference.

TECHNICAL FIELD

Embodiments of the present disclosure relate to boost converters.

BACKGROUND

Switched mode power supplies are well known in the art.

Figure 1:
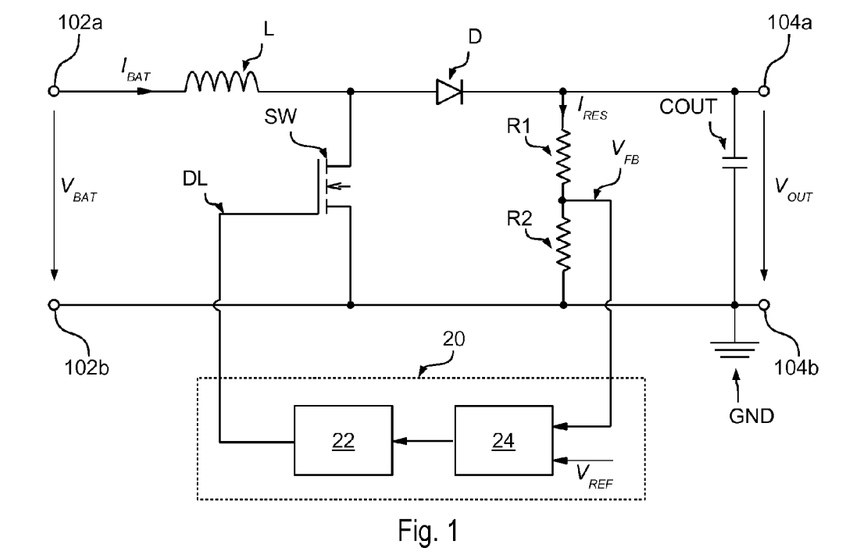

For example, FIG. 1 shows the general architecture of a DC-DC boost converter, which receives a DC input voltage $V_{BAT}$ and provides a DC output voltage $V_{OUT}$, which is greater than the input voltage $V_{BAT}$. For example, the input voltage $V_{BAT}$ may be provided via two input terminals 102a and 102b, wherein the negative input terminal 102b is connected to ground GND, and the output voltage $V_{OUT}$ may be provided via two output terminals 104a and 104b, wherein the negative output terminal 104b is connected to ground GND.

For example, the input voltage $V_{BAT}$ may be provided by any DC power source, such as a battery or a rectified AC voltage, and the output voltage $V_{OUT}$ may be used to power a load. Usually, the output voltage $V_{OUT}$ is a design parameter and is set in advance.

Conventional boost DC-DC converters typically comprise an inductive energy storage element L, e.g. an inductor, and a "free-wheeling" diode rectifier D, which are connected in series between the positive input terminal 102a and the positive output terminal 104a. The diode rectifier D conducts current only in the direction of the load, i.e. the anode is connected to the inductive element L and the cathode is connected to the positive output terminal 104a, and is considered free-wheeling because its operation cannot be controlled independent of the voltages at its anode and cathode. A boost converter usually comprises also an output capacitor COUT connected between the output terminals 104a and 104b, which stabilizes the output voltage $V_{OUT}$.

In the example considered, the boost converter comprises moreover a switch SW, such as a metal-oxide-semiconductor field-effect transistor (MOSFET) of the n-type. Specifically, this switch SW is configured to selectively connect the intermediate point between the inductive element L and the diode D to ground GND as a function of a control signal DL, i.e. the switch SW is connected between this intermediate point and ground GND.

Accordingly, when the switch SW is closed, a current $I_{BAT}$ flows from the positive input terminal 102a and through the inductor L to ground GND, and the inductor L stores energy by generating a magnetic field. Conversely, when the switch SW is opened, current will be reduced as the impedance is higher and the previously created magnetic field will generate a current flow through the diode D and towards the positive output terminal 104a, i.e. the capacitor COUT and the load. Those of skill in the art will appreciate that the diode D may also be replaced with a second switch, which is driven with a signal being substantially complementary to the signal DL, e.g. a signal corresponding to an inverted version of the signal DL.

In this context, a voltage mode control circuitry is often used to control the operation of the boost converter. Specifically, this control circuit performs a closed loop control operation by monitoring the output voltage $V_{OUT}$ and controlling the switching of the switch SW in order to regulate the output voltage $V_{OUT}$ to a desired value.

For example, the circuit may comprise a voltage divider comprising at least two resistors R1 and R2, which are connected in series between the output terminals 104a and 104b, i.e. in parallel with the output capacitor COUT. Accordingly, based on the well-known operation of a voltage divider, the intermediate point between the resistors R1 and R2 provides a voltage $V_{FB}$ being indicative for the output voltage $V_{OUT}$.

In the example considered, this voltage $V_{FB}$ is provided to a control unit 20, which controls the switching operation of the switch SW as a function of the feedback voltage $V_{FB}$.

Generally, different control schemes may be implemented within the control unit 20 for controlling the switch SW as a function of the feedback voltage $V_{FB}$, which are well known to those skilled in the art.

For example, the control circuit 20 may comprise a driver circuit 22 and a detection circuit 24.

For example, the detection circuit 24 may be an error amplifier and the driver circuit 22 may be a pulse-width-modulation (PWM) driver circuit. In this case, the error amplifier 24 is configured to amplify the difference between the voltage $V_{FB}$ with a reference voltage $V_{REF}$. For example, the reference voltage $V_{REF}$ may be derived from the input or output voltage via a voltage regulator or a band-gap reference. The signal at the output of the error amplifier 24 may then be provided to the driver circuit 22, which varies, i.e. increase and/or decreases, the duty cycle of the PWM driver signal DL such that the error signal at the output of the amplifier 24 is substantially zero.

The detection circuit 24 may also comprise only a simple comparator, which compares the voltage $V_{FB}$ with the reference voltage $V_{REF}$. In this case, the driver circuit 24, may generate a pulsed driver signal DL until the signal at the output of the comparator 24 indicates that the feedback voltage $V_{FB}$ has reached the reference voltage $V_{REF}$.

Those of skill in the art will appreciate that also other driving schemes may be used, such as frequency modulation or quasi resonant driving. Moreover, in case of small output loads, the driver circuit 24 may also be deactivated for given time periods and the switch SW may remain opened, usually called "burst mode".

The inventors have observed that independently from the specific implementation of the control unit 20, the (medium) output voltage $V_{OUT}$ will be:

$$V_{OUT} = \left(1 + \frac{R_1}{R_2}\right) V_{REF} \qquad (1)$$

However, at no load condition, i.e. with the load disconnected or switched off, and supposing an ideal efficiency of 100%, there will still be a current consumption $I_{RES}$ by the voltage divider R1/R2 and accordingly a current flow $I_{BAT}$ from the input 102a, which corresponds to:

$$I_{BAT} = \frac{I_{RES}}{V_{BAT}} V_{OUT} \qquad (2)$$

As shown in the foregoing, prior-art voltage loop solution for boost converters have several drawbacks, in particular in terms of current sinking from a the input power supply, such as a battery, in low power applications.

For example, in order to minimize the current consumption of the feedback voltage divider, the resistors of the voltage divider should be large. However, from a practical point of view, the current $I_{RES}$ consumed by the voltage divider usually may not be minimized because, when increasing the resistance values of the resistors R1, R2 of the voltage divider, also their occupied area increases, rendering an integration within an integrated circuit more expansive.

On the basis of the foregoing description, the need is felt for solutions, which overcome one or more of previously outlined drawbacks.

SUMMARY

According to an embodiment, solutions are provided for reducing the power consumption in a boost converter.

Generally, a boost converter receives an input voltage via input terminals and provides a greater output voltage via output terminals. Moreover, the boost converter comprised usually an inductive element, at least one electronic power switch, e.g. a MOSFET and a diode, and preferably an output capacitor.

In various embodiments, the boost converter comprises also a voltage control circuit, which may be integrated in an integrated circuit, configured for driving the at least one electronic power switch of the boost converter as a function of the output voltage.

In various embodiments, the voltage control circuit comprises a voltage divider comprising at least a first and a second resistive element, such as resistors, being connected in series, wherein the voltage divider is coupled to the output terminals, and wherein the intermediate point between the first and the second resistive element provides a feedback voltage. The voltage control circuit comprises also a control unit configured for driving the at least one electronic power switch of the boost converter as a function of this feedback voltage.

In various embodiments, power consumption is reduced by activating and deactivating periodically the voltage divider, wherein the switch on time is usually significantly smaller than the switch off time.

For example, in some embodiments, the voltage control circuit comprises at least one electronic control switch for selectively connecting the voltage divider to the output terminals as a function of an enablement signal. For example, for this purpose, an electronic switch, such as a MOSFET of the n or p type, may be connected in series with one of the resistors of the voltage divider, thereby enabling or disabling the current flow through the voltage divider.

In various embodiments, the voltage control circuit comprises also a timer circuit configured for generating the enablement signal for the control switch, wherein the enablement signal consists in a plurality of pulses, such that the voltage divider is periodically connected to the output terminals for a first time (switch on time) and disconnected from the output terminals for a second time (switch off time).

In various embodiments, the voltage control circuit comprises an analog or digital storage element, which stores a value indicative of the feedback voltage when the voltage divider is connected to the output terminals, i.e. when the feedback voltage is representative for the output voltage. Accordingly, when the voltage divider is disconnected from the output terminals, the stored value may be used by the voltage control circuit.

For example, the analog storage element may comprise a capacitor and a control switch, wherein this control switch is closed when the voltage divider is connected to the output terminals and opened when the voltage divider is disconnected from the output terminals. Such an analog storage element may be interposed e.g. between the intermediate point of the voltage divider providing the feedback voltage and the control unit. Accordingly, the analog storage element stores the feedback voltage during the switch on time.

In various embodiments, the control unit of the voltage control circuit comprises a driver circuit for driving the at least one electronic power switch of the boost converter and a detection unit, such as an error amplifier or a comparator, configured for generating a charge control signal for the driver circuit, wherein the charge control signal indicates weather one or more switching operations have to be performed to increase the output voltage.

In this case, a digital storage element, such as a latch or a flip-flop, or an analog storage element may be interposed between the detection unit and the driver circuit.

In various embodiments, the timer circuit may generate a further enablement signal. For example, is order to ensure that the digital storage element stores only valid values, this further enablement signal may comprise a plurality of pulses, such that the digital storage element stores the respective value only once a given first period of time has passed since the voltage divider has been activated, and/or the voltage divider is deactivated only once a given second period of time has passed since the digital storage element has stores the respective value for the last time.

The above enablement signals may also be used to enable or disable other blocks of the voltage control circuit. For example, the detection unit and/or the analog components of the driver circuit may be activated as a function of the first enablement signal, which represents a kind of analog enablement signal. Conversely, the digital components of the driver circuit may be activated as a function of the second enablement signal.

BRIEF DESCRIPTION OF THE DRAWINGS

Embodiments of the present disclosure will now be described with reference to the annexed drawings, which are provided purely by way of non-limiting example and in which:

FIG. 1 has already been described in the foregoing;

FIGS. 9*a* to 10*f* show waveforms which may occur in the boost converters of the instant disclosure.

DETAILED DESCRIPTION

In the following description, numerous specific details are given to provide a thorough understanding of embodiments.

The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the following Figures parts, elements or components which have already been described with reference to FIG. 1 are denoted by the same references previously used in such Figure; the description of such previously described elements will not be repeated in the following in order not to overburden the present detailed description.

As mentioned in the foregoing, the present disclosure provides solutions for reducing the power consumption of the feedback loop in a boost converter.

Specifically, in various embodiments, the sampling of the output voltage $V_{OUT}$ is only performed for a given time periods and the voltage divider R1/R2 is disconnect, i.e. switched off, for the remaining time, thus reducing the power consumption.

Figure 2:
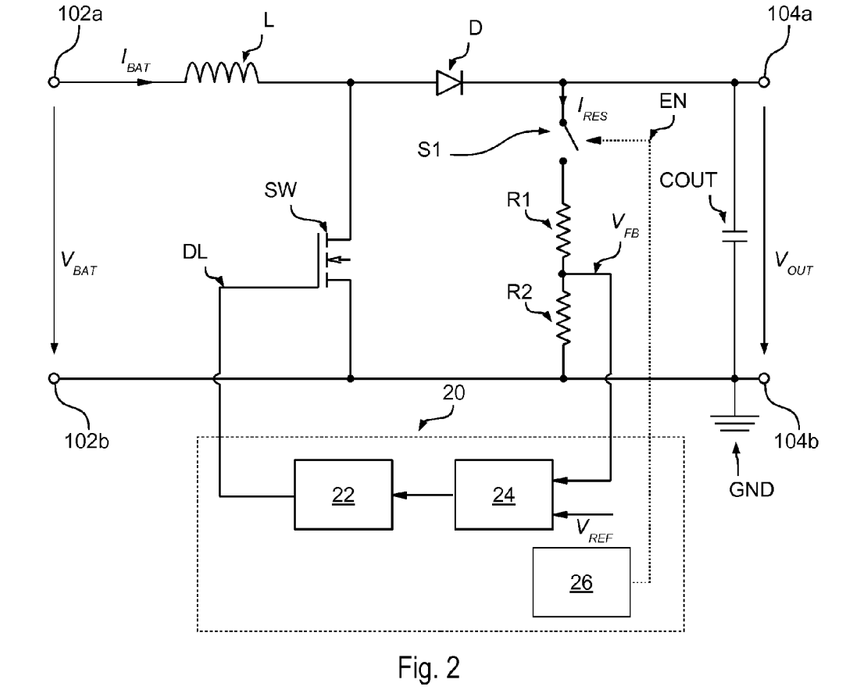
FIG. 2 shows a first embodiment of a boost converter in accordance with the present disclosure.

FIG. 2 shows a first embodiment of a boost converter in accordance with the present disclosure.

Specifically, the general architecture of the boost converter corresponds to architecture shown in FIG. 1 and accordingly the respective description will not be repeated.

In the embodiment considered, an electronic control switch S1, such as a MOSFET of the n or p type, has been added, which is configured for deactivating selectively the voltage divider R1/R2 used to monitor the output voltage $V_{OUT}$. Generally, the switch S1 may be connected in series with one of the resistors R1 or R2. For example, in the embodiment considered, the switch S1 is connected between the cathode of the diode D1 and the voltage divider R1/R2, which generally could comprise also further resistors.

In the embodiment considered, the control circuit 20 comprises moreover a timer circuit 26 configured to generate a control signal EN used to open and close the switch S1, thus activating the voltage divider R1/R2, which in turn permits to monitor the output voltage $V_{OUT}$ through the scaled down version $V_{FB}$.

Figure 3:
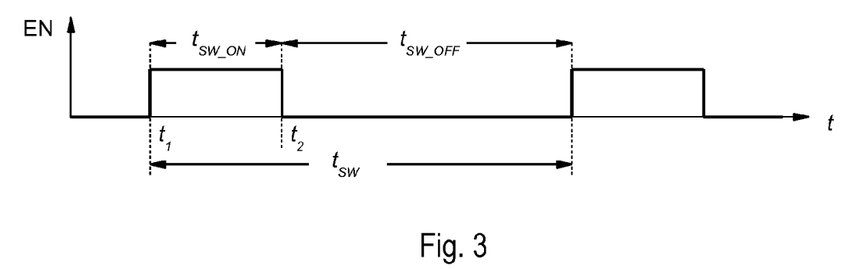
FIG. 3 shows a waveform of a control signal to be used in the boost converter of FIG. 2.

Specifically, as shown in FIG. 3, the signal EN may correspond to a pulsed binary signal, which is activated for a given time $t_{SW\_ON}$ and deactivated for a given time $t_{SW\_OFF}$. Generally, the values for $t_{SW\_ON}$ and $t_{SW\_OFF}$ may be fixed and preconfigured, or could also be variable. For example, in an embodiment, a PWM modulation is used for the signal EN, wherein the signal has a fixed period $t_{SW}=t_{SW\_ON}+t_{SW\_OFF}$, but the duty cycle, e.g. the on time $t_{SW\_ON}$ may be varied.

For example, when the switch S1 is closed at a time $t_1$, the control unit 20 drives the switch SW as described in the foregoing in order to regulate the output voltage $V_{OUT}$. In this case, once the output voltage reaches the desired value at a time $t_2$, the timer circuit 28 may deactivate immediately the signal EN.

However, in general, also the duration $t_{SW}$ may be variable. For example, also the off time $t_{SW\_OFF}$ may be variable and could be determined, e.g. as a function of the feedback voltage $V_{FB}$, e.g. at the time $t_1$, which indices the discharge behavior of the output capacitor COUT. For example, the time $t_{SW\_OFF}$ could be reduced if the output voltage at the time $t_1$ is below a given threshold.

For example, in an embodiment may be used two voltage threshold values and a window comparator, wherein the times $t_{SW\_ON}$ and $t_{SW\_OFF}$ are regulated in order to keep the feedback voltage $V_{FB}$ between these threshold values.

In various embodiments, power consumption may further be reduced by placing the control unit 20 in a low power or stand-by mode. For example, the driver circuit 22 and/or the detection circuit 24 could be deactivated. Generally, in the standby mode, only the timer circuit 26 (and possibly an associated oscillator or clock generator) could be maintained active and the other digital and analog components of the voltage control circuit could be switched off.

Accordingly, in the embodiment considered, the average current $I_{RES\_SAMPLE}$ consumed by the voltage divider R1/R2 may be written as:

$$I_{RES\_SAMPLE} = \frac{t_{SW\_ON}}{t_{SW}} I_{RES} \quad (3)$$

where $t_{SW\_ON}$ is the time where the voltage divider R1 and R2 is activated, i.e. connect to $V_{OUT}$, and the boost converter works in normal mode, and $t_{SW\_OFF}=t_{SW}-t_{SW\_ON}$ is the time where the voltage divider is disconnected (and the control circuitry 20 is in a low power mode).

Accordingly, by combining equations (2) and (3), the medium current flow $I_{BAT}$ from the power source, e.g. the battery, will be:

$$I_{BAT} = \frac{t_{SW\_ON}}{t_{SW}} I_{RES} \frac{V_{OUT}}{V_{BAT}} \quad (4)$$

Consequently, the current consumption from the battery may be reduced by the ratio $t_{SW\_ON}/t_{SW}$ and it is possible to reduce drastically the power consumption by choosing the right switching time for the switch S1.

Accordingly, the solutions described herein are particularly suitable for the burst mode operation. In fact, in the absence of an output load, the time $t_{SW\_ON}$ may be rather short compared to the switching period $t_{SW}$. However, generally, the solutions may also be used for the normal operation, whereby the voltage divider R1/R2 may be deactivated periodically.

Figure 4:
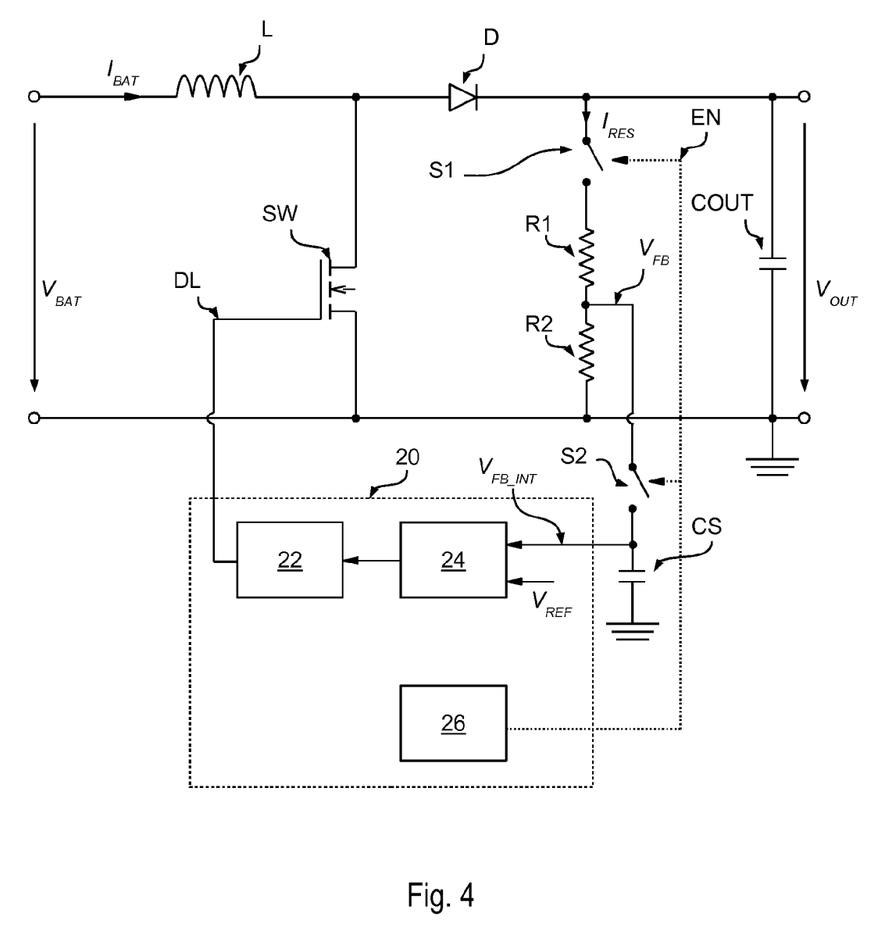
FIG. 4 shows a second embodiment of a boost converter in accordance with the present disclosure.

FIG. 4 shows a second embodiment, in which has been added a further electronic control switch S2 and a storage capacitor CS.

Specifically, also in this embodiment the first electronic switch S1 is used to selectively activate or deactivate the voltage divider R1/R2 used to generate the feedback voltage $V_{FB}$ thus monitoring the output voltage $V_{OUT}$.

However, in this case, a second switch S2 is configured to selectively transfer the feedback voltage $V_{FB}$ to a storage capacitor CS, and the subsequent control circuit 20 operated with the voltage $V_{FB\_INT}$ at the storage capacitor CS. For example, in the embodiment considered, the second switch S2 is connected between the intermediate point of the voltage divider R1/R2 and a first terminal of the capacitor CS, the second terminal of the capacitor CS is connected to ground GND and the control circuit 20 operates as a function of the voltage $V_{FB\_INT}$ at the capacitor CS.

In an embodiment, the second switch S2 is driven with the same control signal EN used to drive the first switch S1. Thus, when the first switch S1 is closed and the voltage divider R1/R2 is activated, also the second switch S2 is closed and the capacitor CS is charged to the feedback voltage $V_{FB}$. Conversely, when the first switch S1 is opened and the voltage divider is deactivated, also the second switch is opened and the voltage $V_{FB\_INT}$ at the capacitor CS is maintained substantially constant.

Accordingly, in the embodiment considered, the capacitor CS operates as an analog storage element and maintains the value of the feedback voltage $V_{FB}$ during the period $t_{SW\_OFF}$, when the voltage divider R1/R2 is deactivated via the switch S1. Generally, the analog storage element (e.g. the capacitor CS and the associated switch S2) may also be provided at the output of the detection circuit 24, e.g. at the output of a comparator or an error amplifier.

Instead of using an analog storage element, the control circuit 20 may also comprise a digital storage element 28.

For example, in case the detection circuit 24 comprises a comparator, which compares the feedback voltage $V_{FB}$ with a reference voltage $V_{REF}$, the digital storage element 30 may be implemented with a latch or a flip flop.

Figure 5:
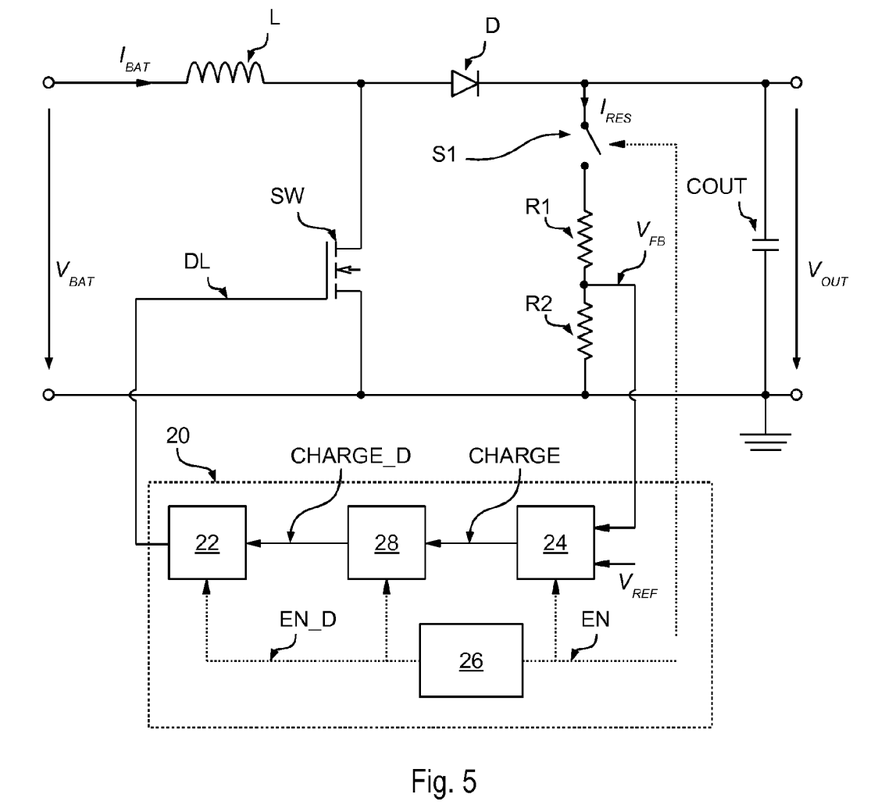
FIG. 5 shows a third embodiment of a boost converter in accordance with the present disclosure.

For example, FIG. 5 shows an embodiment, wherein a digital storage element 28, such as a flip flop of the "D" type, is interposed between the detection circuit 24 and the driver circuit 22.

Specifically, in the embodiment considered, the detection circuit 24 comprises a comparator, which compares the feedback voltage $V_{FB}$ with a reference voltage $V_{REF}$. For example, in the embodiment considered the comparator provides at the output a signal CHARGE, which is set to the logic value "1" when the feedback voltage $V_{FB}$ is smaller than the reference voltage $V_{REF}$ and to the logic value "0" when the feedback voltage $V_{FB}$ is equal or greater than reference voltage $V_{REF}$.

Accordingly, when the switch S1 is closed and the voltage divider R1/R2 is activated by means of the signal EN and the switch S1, the signal CHARGE indicates whether the boost converter should recharge the output capacitor COUT.

In the embodiment considered, the digital storage element 28 is driven by a second control signal EN_D. Specifically, in the embodiment considered, the signal EN_D represents a sample signal for the digital storage element 28. For example, in the embodiment considered, the digital storage element 28 may store or "sample" the value of the signal CHARGE at each raising and falling edge of the signal EN_D or store the value of the signal CHARGE as long as the signal EN_D enables the storage element 28. For example, in case the digital storage element 28 comprises a latch of the D type, the signal EN_D may be used as enable signal for the latch. Conversely, in case the digital storage element 28 comprises a flip flop of the D type, the signal EN_D may be used as clock signal for the flip-flop.

For example, the digital storage element 28 may comprises a flip flop of the D type, which is configured to store the value at a data input terminal at each rising and falling edge of a signal provided at a clock terminal. In this case, the signal EN_D may be connected directly to the clock terminal of the flip-flop and the signal CHARGE may be connected to the data input terminal of the flip-flop. Accordingly, in the embodiment considered, the data output terminal of the digital storage element 28 provides a signal CHARGE_D, which stores the value of the signal CHARGE only at each raising and falling edge of the signal EN_D.

Figure 6:
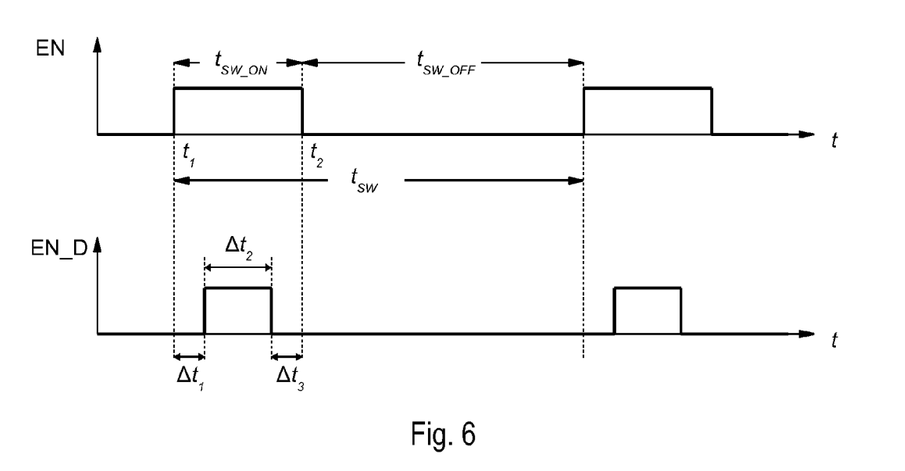
FIG. 6 shows waveforms of control signals to be used in the boost converter of FIG. 5.

FIG. 6 shows a possible embodiment of the waveform of the signals EN and EN_D.

Specifically, also in this case, the signal EN may be a pulsed signal, wherein the signal is switched on and off for respective periods $t_{SW\_ON}$ and $t_{SW\_OFF}$, which may be fixed of variable. For example, in an embodiment, the durations are fixed and predetermined.

In the embodiment considered, also the signal EN_D is a pulsed signal, which satisfies certain timing constrains with respect to the signal EN. Specifically, in the embodiment considered, once the signal EN activates the voltage divider R1/R2 a given period of time $\Delta t_1$ has to pass before the signal EN_D changes state, e.g. changes from the logic state "0" to the logic state "1", thus sampling the signal CHARGE at the output of the comparator 24. Moreover, the signal EN may deactivate the voltage divider R1/R2 only a given period of time $\Delta t_3$ after the last sampling operation. Accordingly, in the embodiment considered, the signal EN_D remains at the logic level "1" for a period $\Delta t_2$ which corresponds to:

$$\Delta t_2 = t_{SW\_ON} - \Delta t_1 - \Delta t_3$$

Accordingly, in the embodiment considered, the signal EN_D indicates that the voltage divider has been activated, and the signal CHARGE at the output of the comparator 24 is valid. For this reason, the signal EN_D may also be used to enable the driver circuit 22 and possibility other digital circuits in the feedback loop of the control unit 20. Conversely, the signal EN, which enables the voltage divider R1/R2, may be used to activate and deactivate the analog components of the feedback loop, such as the detection circuit 24, which usually comprises an analog comparator or amplifier.

Figure 7:
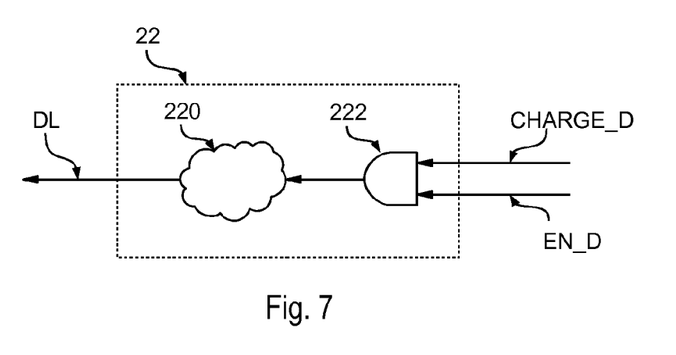
FIG. 7 shows a detail of the boost converter of FIG. 7.

For example, as shown in FIG. 7, a simple AND gate 222 may be used to combine the signal CHARGE_D with the signal EN_D. Accordingly, in this case, the circuitry 220 of the driver 24 configured to generate the driver signal DL, will only recharge the output capacitor COUT through one or more switching operations of the switch SW when both the signal CHARGE_D and the signal EN_D are high.

Accordingly, in the embodiment considered, the time $\Delta t_1$ guarantees that the voltage divider R1/R2 is activated, the feedback voltage $V_{FB}$ stabilizes, and the output of the comparator 24 reaches a valid state. At the beginning of time $\Delta t_2$ the signal CHARGE is stored, and during the time $\Delta t_2$ the boost converter is active. Moreover, at the end of the time $\Delta t_2$, the charge information, i.e. the signal CHARGE, is stored for the next cycle. Finally, the time $\Delta t_3$ permits to switch the analog part off.

Figure 8:
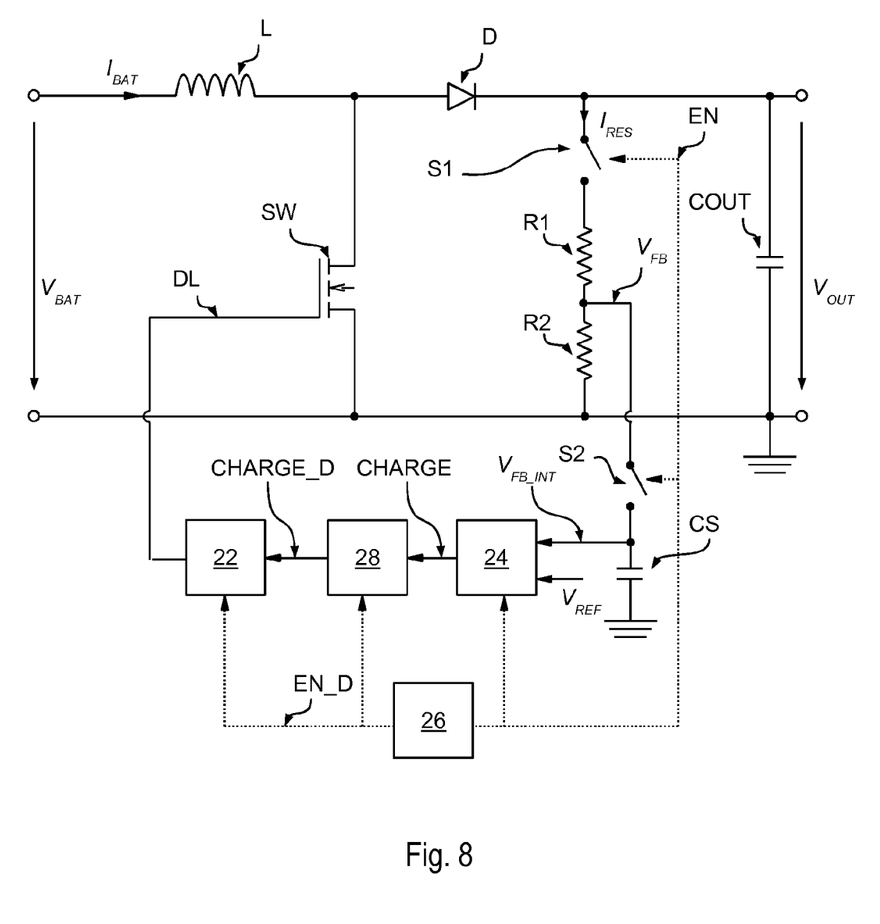
FIG. 8 shows a fourth embodiment of a boost converter in accordance with the present disclosure.

As shown in FIG. 8, the analog storage element CS (with the associated control switch S2) may also be used in combination with the digital storage element 28. In this case, the time $\Delta t_1$ should be sufficiently long in order to permit the capacitor CS to reach, i.e. charge or discharge, to the feedback voltage $V_{FB}$ provided by the voltage divider R1/R2.

Figure 9A:
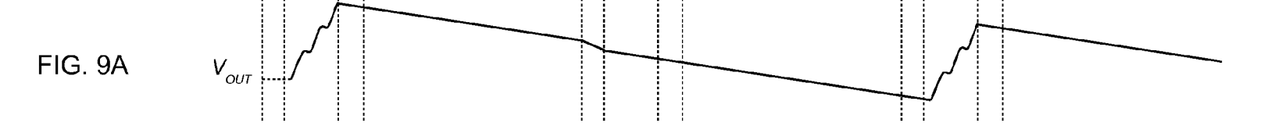
Figure 9B:
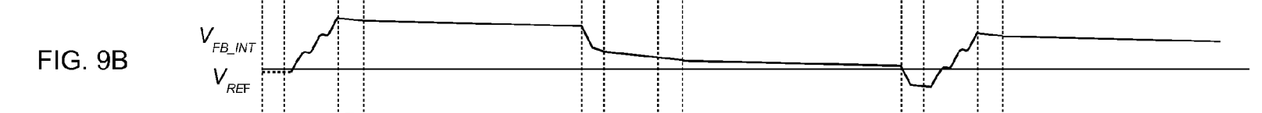
Figure 9C:
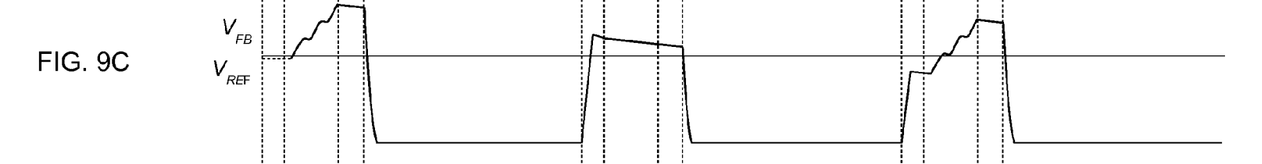
Figure 9D:
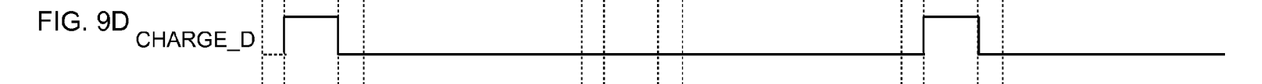
Figure 9E:
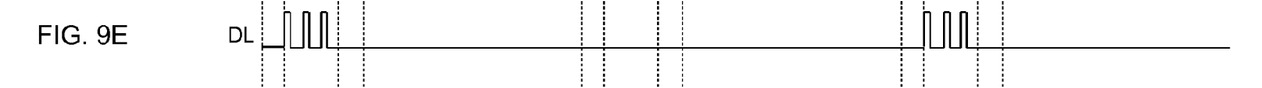
Figure 9F:
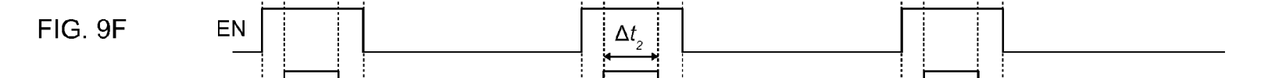
Figure 9G:
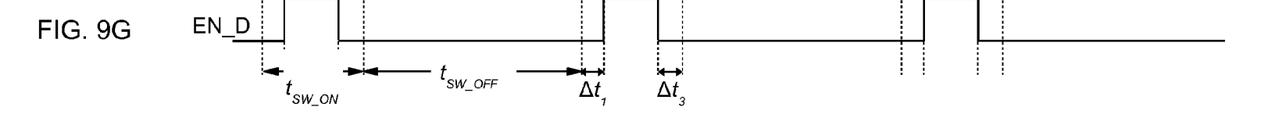

FIGS. 9a to 9g show in this respect possible waveforms, wherein:

FIG. 9a shows the output voltage $V_{OUT}$,

FIG. 9b shows the voltage $V_{FB\_INT}$ at the capacitor CS, which is feed to the input of the comparator 24 for comparison with the reference voltage $V_{REF}$, FIG. 9c shows the voltage $V_{FB}$ at the intermediate point of the voltage divider R1/R2 with respect to the reference voltage $V_{REF}$, FIG. 9*d* shows a possible signal CHARGE_D at the output of the digital storage element 28, i.e. the sampled version of the signal CHARGE at the output of the comparator, FIG. 9*e* shows a possible waveform of the drive signal DL, FIGS. 9*f* and 9*g* show possible waveforms of the control signals EN and EN_D, which correspond to the waveforms shown in FIG. 6.

In the embodiment considered, the switching phase of the boost converter is allowed only when the signal EN_D enables the driver 22, i.e. during the time $\Delta t_2$, and the signal CHARGE_D indicated that the voltage $V_{OUT}$ is smaller than a target voltage, i.e. when the feedback voltage $V_{FB\_INT}$ is smaller than the reference voltage $V_{REF}$. In this case, based on the specific driving scheme implemented in the driver 22, the driver 22 will generate a signal DL comprising a fixed or variable number of pulses, with a fixed of variable duration, thereby opening and closing the switch SW in order to deliver power to the output. For example, the duration of the interval $\Delta t_2$ may be selected taking into account the maximum leakage occurring at the output during the switch off phase, thus permitting recovering the output steady state in this time.

Specifically, as shown in FIG. 9*c*, once the signal EN enables the voltage divider R1/R2, the feedback voltage $V_{FB}$ increases and follows the behavior of the output voltage $V_{OUT}$, while the feedback voltage $V_{FB}$ is zero when the enable signal EN deactivates the voltage divider R1/R2. Moreover, when the voltage divider R1/R2 is activated, also the analog storage capacitor CS is connected to the feedback voltage $V_{FB}$ and the voltage $V_{FB\_INT}$ follows the voltage $V_{FB}$ (see FIG. 9*b*), while the voltage $V_{FB\_INT}$ remains substantially stable when the voltage divider R1/R2 is deactivated, e.g. when the signal EN is low.

In the embodiment considered, the detection circuit 24 compares the voltage $V_{FB\_INT}$ with the reference voltage $V_{REF}$ (see e.g. FIG. 9*b*).

For example, in case the digital storage element 28 comprises a flip flop of the D type interposed between a comparator 24 and the driver 22, the value of the signal CHARGE may be sampled at the beginning of the time $\Delta t_2$ and, independent of possible variations of the signal CHARGE, remains stable for the complete duration $\Delta t_2$. Accordingly, in case the signal CHARGE indicates at the beginning of the time $\Delta t_2$ that the output capacitor COUT should be recharged, the driver 22 may generate a fixed number of pulses in the signal DL.

For example, at the raising edge of the signal EN_D during the first switching cycle, the voltage $V_{FB\_INT}$ is smaller than the reference voltage $V_{REF}$ and accordingly the signal CHARGE_D is set to high. Accordingly, in this case, the driver circuit 22 creates one or more pulses in the driver signal DL in order to increase the output voltage $V_{OUT}$. At the end of the period $\Delta t_2$, i.e. when the signal EN_D changes from high to low, the signal at the output of the detection circuit 24 is sampled again. For example, in the example considered, at this moment the voltage $V_{FB\_INT}$ is greater than the reference voltage $V_{REF}$ and accordingly the signal CHARGE_D is set to low.

Generally, in particular in case of small output loads, a recharge of the output capacitor COUT might not be required for all switching cycles. Accordingly, in case the voltage $V_{FB\_INT}$ is greater than the voltage reference $V_{REF}$ at the beginning of the time $\Delta t_2$, e.g. the signal CHARGE would be low, the signal CHARGE_D at the output of the flip-flop will indicate for the complete duration $\Delta t_2$ that no switching activity is required and the output voltage $V_{OUT}$ will continue to decrease until a next cycle is performed. For example, during the second cycle (see e.g. FIG. 9*b*), the voltage $V_{FB\_INT}$ remains above the reference voltage $V_{REF}$ and accordingly the signal CHARGE_D remains at zero.

Conversely, in case a latch is used for the digital storage element 30, a change of the signal CHARGE during the time $\Delta t_2$ would be communicated directly to the driver circuit 24.

Generally, the times $t_{SW\_ON}$ and $t_{SW}$ should be selected to reduce the current consumption from the battery, but a very small ratio $t_{SW\_ON}/t_{SW}$ may cause a loss of regulation.

For example, in the absence of an output load, the ratio $t_{SW\_ON}/t_{SW}$ may be between 0.01 and 0.10, e.g. 0.04, and the time $t_{SW}$ may be several ms, e.g. between 1 and 20 ms, preferably between 5 and 10 ms. In fact, usually, the leakage current is not able to discharge the output capacitor COUT in severe milliseconds, but significant higher times, usually between 50 and 100 ms, are required before a new recharge operation is required. Accordingly, the signals CHARGE or CHARGE_D are usually only triggered after several monitoring phases.

Figure 10A:
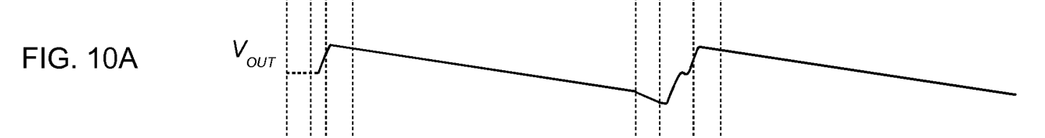
Figure 10B:
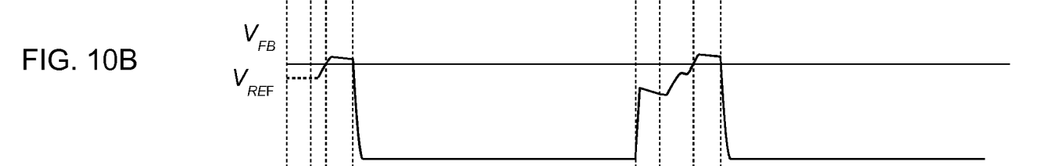
Figure 10C:
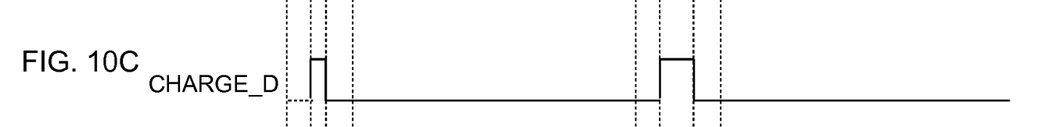
Figure 10D:
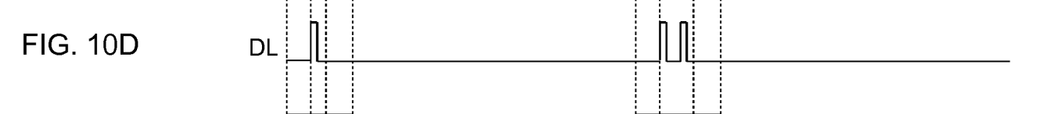
Figures 10E, 10F:
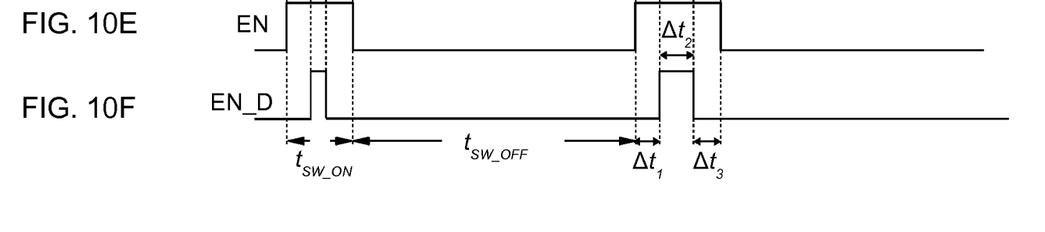

FIGS. 10*a* to 10*f* show further exemplary waveforms, which may occur e.g. in the embodiment shown in FIG. 5, which comprises only a digital storage element 28. Specifically:

FIG. 10*a* shows the output voltage $V_{OUT}$,

FIG. 10*b* shows the voltage $V_{FB}$ at the intermediate point of the voltage divider R1/R2 with respect to the reference voltage $V_{REF}$, FIG. 10*c* shows a possible signal CHARGE_D at the output of the digital storage element 28, i.e. the sampled version of the signal CHARGE at the output of the comparator, FIG. 10*d* shows a possible waveform of the drive signal DL, FIGS. 10*e* and 10*f* show possible waveforms of the control signals EN and EN_D.

Also in this case, the voltage divider R1/R2 and possibly also other analog component of the voltage control circuit, such as the comparator 24, are activated and deactivated as a function of the control signal EN. Moreover, also in this case, the signal EN_D activates the digital storage element 28 after a given period of time $\Delta t_1$ in order to store the signal at the output of the comparator 24. Thus, again, the driver 22 will generate one or more pulses in the signal DL in order increase the output voltage.

However, compared to FIG. 9, in this case the signal CHARGE_D at the output of the digital storage element 28 is set to zero (preferably immediately) when the feedback voltage $V_{FB}$ reaches the reference voltage, i.e. when the signal CHARGE at the output of the comparator 24 goes to low.

Accordingly, in the embodiment considered, the driver circuit 22 will generate only the number of pulses which are required to raise the feedback voltage $V_{FB}$ above the reference voltage $V_{REF}$.

For example, as shown in FIG. 10*d*, a single pulse might be sufficient for the first cycle and two pulses might be required for the second cycle.

For example, the above behavior may be achieved by using a latch as digital storage element 28 or be resetting the flip-flop as a function of the signal CHARGE.

Moreover, when the signal CHARGE_D goes to low (thereby deactivating the driver 22), the timer circuit 26 may also deactivate the signal EN_D, thus reducing the time $\Delta t_2$. Generally, the time $\Delta t_2$ could be also fixed, but as mentioned in the foregoing power consumption may be reduced by deactivating the digital components of the voltage control circuit as a function of the signal EN_D.

In an alternative embodiment, the timer circuit 26 could also deactivate the signal EN_D directly as a function of the signal CHARGE, e.g. change the state of the signal EN_D once the signal CHARGE at the output of the comparator 24 indicates that the feedback voltage $V_{FB}$ has reached the reference voltage $V_{REF}$. For example, as described in the forgoing, the driver circuit 22 may be deactivated in this case and/or the digital storage element 28 may sample again the signal CHARGE (which at this moment is low).

Similarly, also the signal EN may be deactivated (once the time $\Delta t_3$ has passed), thus reducing also the power consumption of the analog components of the voltage control circuit.

Thus, in the embodiment considered, the durations ($t_{SW\_ON}$ and $\Delta t_2$) of the pulses in the signal EN and/or EN_D are variable and the number of pulses generated in the signal DL is variable. For example, the duration $\Delta t_2$ could also be zero in case the signal CHARGE indicates that the feedback voltage $V_{FB}$ is above the reference voltage $V_{REF}$ already at the beginning of the switching cycle.

Similarly, also the duration $t_{SW\_OFF}$ could be adapted. For example, the duration $t_{SW\_OFF}$ could be decreased when more than a given number of pulses in the signal DL, such as more than one or two pulse, are required to raise the feedback voltage $V_{FB}$ above the reference voltage $V_{REF}$. Conversely, the duration $t_{SW\_OFF}$ could be increased when the feedback voltage $V_{FB}$ remains above the reference voltage $V_{REF}$, e.g. when the signal CHARGE or CHARGE_D remains low, for a given number of switching cycles, such as one or two switching cycles.

Generally, the driving scheme described with respect to FIG. 10 may also be used in combination with the other voltage control circuits of the present disclosure.

Accordingly, the present disclosure provides solutions for Low Power Mode applications of a boost converter. In particular, the complete voltage control circuit comprising the voltage divider R1/R2 and the control circuit 20, and possibly also other parts of the boost converter, such as the electronic power switch SW and the diode D, may be integrated within an integrated circuit.

Moreover, the output voltage $V_{OUT}$ may be generated with low power consumption from the battery by periodically activating and deactivating the voltage divider R1/R2 used to provide the feedback voltage $V_{FB}$ for the voltage control loop.

In various embodiments, an analog or a digital storage element may be used to store a value indicative of the feedback voltage $V_{FB}$, e.g. directly the feedback voltage $V_{FB}$ (e.g. by means of a storage capacitor CS) and/or the value at the output of the detection circuit 24 (e.g. by means of a latch or flip-flop). Accordingly, also when the voltage divider R1/R2 is switched off, the voltage control loop may operate correctly.

Moreover, in particular with small output loads or in the absence of an output load, power consumption may be reduced further by switching off also other analog and/or digital components in the voltage control loop, such as the detection circuit 24 and the driver circuitry 22, and only the timer circuit 26 configured to provide the respective activation signals EN and EN_D may remain activated.

Of course, without prejudice to the principle of the invention, the details of construction and the embodiments may vary widely with respect to what has been described and illustrated herein purely by way of example, without thereby departing from the scope of the present invention, as defined by the ensuing claims.

The invention claimed is:

1. A boost converter, comprising:
input terminals configured to receive an input voltage;
output terminals configured to provide an output voltage;
at least one electronic power switch;
a voltage control circuit comprising:
   a voltage divider comprising at least a first resistive element and a second resistive element connected in series, wherein said voltage divider is coupled to said output terminals, and wherein an intermediate point between said first and second resistive elements provides a feedback voltage;
   a control unit configured to drive said at least one electronic power switch as a function of said feedback voltage;
   at least one electronic control switch configured for selectively connecting said voltage divider to said output terminals as a function of an enablement signal; and
   a timer circuit configured to generate said enablement signal;
wherein said enablement signal comprises a plurality of pulses such that said voltage divider is periodically connected to said output terminals for a first time and disconnected from said output terminals for a second time;
wherein said voltage control circuit comprises a storage element configured to:
   store a value indicative of said feedback voltage when said voltage divider is connected to said output terminals; and
   provide said stored value when said voltage divider is disconnected from said output terminals;
wherein said control unit comprises:
   a driver circuit configured to drive said at least one electronic power switch of said boost converter; and
   a detection unit configured to generate a charge control signal for said driver circuit, said charge control signal indicating whether one or more switching operations of said least one electronic power switch have to be performed to increase said output voltage;
wherein said storage element comprises a latch or flip-flop interposed between said detection unit and said driver circuit; and
wherein said timer circuit is configured to generate a further enablement signal, and wherein said storage element is configured for storing said value indicative of said feedback voltage as a function of said further enablement signal.

2. The boost converter of claim 1, wherein said voltage control circuit comprises a storage element configured to:
store a value indicative of said feedback voltage when said voltage divider is connected to said output terminals; and
provide said stored value when said voltage divider is disconnected from said output terminals.

3. The boost converter of claim 2, wherein said storage element comprises a capacitor and further comprising a further control switch coupled to said timer circuit such operating to be closed when said voltage divider is connected to said output terminals and opened when said voltage divider is disconnected from said output terminals.

4. The boost converter of claim 2, wherein said storage element is interposed between the intermediate point between said first and said second resistive elements and said control unit.

5. The boost converter of claim 1, wherein said further enablement signal comprises a plurality of pulses such that:
   said storage element stores said value indicative of said feedback voltage only once a given first period of time has passed since said voltage divider has been connected to said output terminals.

6. The boost converter of claim 5, wherein said control unit is configured to selectively enable and disable said detection unit as a function of said enablement signal.

7. The boost converter of claim 5, wherein said control unit is configured to selectively enable and disable the analog components of said driver circuit as a function of said enablement signal.

8. The boost converter of claim 5, wherein said control unit is configured to selectively enable and disable the digital components of said driver circuit as a function of said further enablement signal.

9. The boost converter of claim 1, wherein said further enablement signal comprises a plurality of pulses such that:
   said voltage divider is disconnected from said output terminals only once a given second period of time has passed since said digital storage element has stored said value indicative of said feedback voltage.

10. The boost converter of claim 1, implemented as an integrated circuit.

* * * * *